United States Patent
Hurley et al.

(10) Patent No.: US 12,204,883 B2
(45) Date of Patent: Jan. 21, 2025

(54) TECHNIQUES FOR DEPLOYING APPLICATION EXTENSIONS FOR A CLIENT SYSTEM

(71) Applicant: Stripe, Inc., San Francisco, CA (US)

(72) Inventors: Gabriel Hurley, Oakland, CA (US); Timothy James Fontaine, San Francisco, CA (US); Julia Chaves, Oakland, CA (US); Justin Tulloss, Truckee, CA (US); Kenneth Auchenberg, New York, NY (US); Sandhya Jagannath, Palo Alto, CA (US)

(73) Assignee: Stripe, Inc., South San Francisco, CA (US)

( * ) Notice: Subject to any disclaimer, the term of this patent is extended or adjusted under 35 U.S.C. 154(b) by 23 days.

(21) Appl. No.: 18/094,289

(22) Filed: Jan. 6, 2023

(65) Prior Publication Data

US 2024/0231784 A1 Jul. 11, 2024

(51) Int. Cl.
*G06F 8/60* (2018.01)
*G06F 9/445* (2018.01)
*G06F 9/451* (2018.01)

(52) U.S. Cl.
CPC ............ *G06F 8/60* (2013.01); *G06F 9/44526* (2013.01); *G06F 9/451* (2018.02)

(58) Field of Classification Search
USPC .................................................. 717/174–178
See application file for complete search history.

(56) References Cited

U.S. PATENT DOCUMENTS

| | | | |
|---|---|---|---|
| 8,756,617 B1 * | 6/2014 | Boodman | H04L 63/0823 726/25 |
| 8,914,358 B1 | 12/2014 | Pearson | |
| 9,110,577 B1 | 8/2015 | Alur et al. | |
| 9,442,832 B2 | 9/2016 | Bharara | |
| 11,023,261 B1 | 6/2021 | Jensen | |
| 11,061,976 B1 | 7/2021 | Brody | |
| 11,070,646 B1 | 7/2021 | Lingafelt | |
| 11,107,580 B1 | 8/2021 | Felton | |
| 11,245,744 B1 | 2/2022 | Brevoort et al. | |
| 11,289,200 B1 | 3/2022 | Gregg | |
| 11,444,903 B1 | 9/2022 | Brevoort et al. | |
| 11,455,166 B2 | 9/2022 | Brevoort et al. | |
| 11,558,453 B2 | 1/2023 | Brevoort et al. | |
| 2005/0021405 A1 | 1/2005 | Agarwal | |
| 2007/0028043 A1 | 2/2007 | Jantz | |

(Continued)

FOREIGN PATENT DOCUMENTS

| | | |
|---|---|---|
| CA | 3071669 A1 | 2/2019 |
| CA | 2982062 A1 | 4/2019 |
| CN | 100422939 C | 10/2008 |

OTHER PUBLICATIONS

Asgarnezhad, et al., "Analysis and Evaluation of Two Security Services in SOA," IEEE 5th International Conference on Internet and Web Applications and Services (ICIW), May 2010, pp. 562-568.

(Continued)

*Primary Examiner* — Qing Chen
(74) *Attorney, Agent, or Firm* — BAKERHOSTETLER

(57) ABSTRACT

The disclosure generally describes one or more techniques for supporting deployment of application extensions for a client system.

20 Claims, 9 Drawing Sheets

(56) References Cited

U.S. PATENT DOCUMENTS

| | | | |
|---|---|---|---|
| 2007/0201654 A1* | 8/2007 | Shenfield | G06F 9/44521 |
| | | | 379/201.01 |
| 2009/0182565 A1 | 7/2009 | Erickson | |
| 2012/0102485 A1* | 4/2012 | Goldman | G06F 9/44526 |
| | | | 717/176 |
| 2012/0215798 A1 | 8/2012 | Burris | |
| 2013/0232485 A1 | 9/2013 | Murray | |
| 2016/0335058 A1* | 11/2016 | Weckwerth | G06F 11/3664 |
| 2017/0235559 A1* | 8/2017 | Saenz | G06F 11/3672 |
| | | | 717/171 |
| 2018/0143949 A1* | 5/2018 | Stachowicz | H04L 67/53 |
| 2019/0265884 A1 | 8/2019 | Penilla | |
| 2019/0332808 A1 | 10/2019 | Dunjic | |
| 2019/0377832 A1 | 12/2019 | McLean | |
| 2020/0019414 A1* | 1/2020 | Byard | G06F 9/44526 |
| 2020/0204574 A1 | 6/2020 | Christian | |
| 2020/0259852 A1 | 8/2020 | Wolff | |
| 2021/0036994 A1 | 2/2021 | Samayavel | |
| 2021/0149688 A1 | 5/2021 | Newell et al. | |
| 2021/0152541 A1 | 5/2021 | Caldwell | |
| 2022/0060523 A1 | 2/2022 | Brevoort et al. | |
| 2022/0245557 A1 | 8/2022 | Minter | |
| 2022/0414526 A1 | 12/2022 | Darrah | |
| 2023/0081429 A1* | 3/2023 | Babtkis | G06F 9/44526 |
| | | | 726/17 |
| 2023/0123496 A1* | 4/2023 | David | G16H 10/60 |
| | | | 719/331 |

OTHER PUBLICATIONS

Ranchal, et al., "Privacy Preserving Access Control in Service-Oriented Architecture," IEEE International Conference on Web Services (ICWS), Jun. 2016, pp. 412-419.

Seffah et al., "Multiple User Interfaces Cross-Platform Applications and Context-Aware Interfaces," 2004. retrieved from https://onlinelibrary.wiley.com/doi/pdf/10.1002/0470091703#page=28, 395 pages (in two parts).

International Search Report and Written Opinion from PCT/US2024/010766, dated Apr. 15, 2024, 16 pages.

Notice of Allowance from U.S. Appl. No. 18/094,281, dated Jun. 6, 2024, 11 pages.

Notice of Allowance from U.S. Appl. No. 18/094,286, dated Jul. 9, 2024, 13 pages.

Notice of Allowance from U.S. Appl. No. 18/094,290, dated Aug. 7, 2024, 9 pages.

Notice of Allowance from U.S. Appl. No. 18/094,290, dated May 16, 2024, 17 pages.

* cited by examiner

TECHNIQUES FOR DEPLOYING APPLICATION EXTENSIONS FOR A CLIENT SYSTEM

TECHNICAL FIELD

The disclosure generally relates to software development.

BACKGROUND

Many users utilize application extensions to extend the functionality of an application. These extensions can be made by the same developer as the application, or third-party developers. These extensions can have one or more user interface elements that allow user interaction with the extension. To function properly, many extensions need access to a set of data (e.g., of the application, or from another source).

SUMMARY

Some current techniques for implementing application extensions can be cumbersome, time consuming, and/or inefficient due to the amount of work required by a software developer who is attempting to integrate the extension into an application (and/or webpage). This work might be required to ensure, amongst other reasons, that (1) the extension functions as intended, (2) the extension displays correctly with the application, and/or (3) the appropriate data and/or access security and permissions associated with the application, the extension, and/or a user are maintained. It can be beneficial to provide the software developer with a plug-and-play solution so they can quickly integrate functionality that shares a style or branding of existing user interface in the application without having to do all the development themself. With respect to functioning as intended, the software developer may need to ensure that an extension has access to the data that it needs to function properly, including any necessary authentication and/or permissions requirements. With respect to displaying correctly, the software developer may need to ensure that the user interface element(s) resulting from an extension displays correctly in conjunction with the application. With respect to data security, the software developer may need to ensure that the extension can be configured with the proper permissions for functioning correctly without sacrificing the security of the application. Finally, application extensions that require storage and processing resources can affect the performance of the application and/or computing device executing the application.

This disclosure provides techniques associated with deploying application extensions that can add functionality to an application, provide developer control of displayed interfaces of the extension and/or application, be lightweight from a client perspective, and/or be subject to authentication and permissions-based restrictions.

In some embodiments, a method is described. In some embodiments, the method comprises: receiving, from a client system, data corresponding to an interaction with an extension; in response to determining that the extension is a first extension: selecting a first set of code that is associated with the first extension; and sending a first set of instructions to the client system over a secure channel established between an inline frame element and the client system, and wherein the first set of instructions is generated based on the data corresponding to the interaction with the extension and the first set of code; and in response to determining that the extension is a second extension that is different from the first extension: selecting a second set of code that is associated with the second extension, wherein the second set of code is different from the first set of code; and sending a second set of instructions to the client system over the secure channel established between the inline frame element and the client system, and wherein the second set of instructions is generated based on the data corresponding to the interaction with the extension and the second set of code.

In some embodiments, a non-transitory computer-readable storage medium storing one or more programs configured to be executed by one or more processors of a computer system is described. In some embodiments, the one or more programs includes instructions for: receiving, from a client system, data corresponding to an interaction with an extension; in response to determining that the extension is a first extension: selecting a first set of code that is associated with the first extension; and sending a first set of instructions to the client system over a secure channel established between an inline frame element and the client system, and wherein the first set of instructions is generated based on the data corresponding to the interaction with the extension and the first set of code; and in response to determining that the extension is a second extension that is different from the first extension: selecting a second set of code that is associated with the second extension, wherein the second set of code is different from the first set of code; and sending a second set of instructions to the client system over the secure channel established between the inline frame element and the client system, and wherein the second set of instructions is generated based on the data corresponding to the interaction with the extension and the second set of code.

In some embodiments, a transitory computer-readable storage medium storing one or more programs configured to be executed by one or more processors of a computer system is described. In some embodiments, the one or more programs includes instructions for: receiving, from a client system, data corresponding to an interaction with an extension; in response to determining that the extension is a first extension: selecting a first set of code that is associated with the first extension; and sending a first set of instructions to the client system over a secure channel established between an inline frame element and the client system, and wherein the first set of instructions is generated based on the data corresponding to the interaction with the extension and the first set of code; and in response to determining that the extension is a second extension that is different from the first extension: selecting a second set of code that is associated with the second extension, wherein the second set of code is different from the first set of code; and sending a second set of instructions to the client system over the secure channel established between the inline frame element and the client system, and wherein the second set of instructions is generated based on the data corresponding to the interaction with the extension and the second set of code.

In some embodiments, a computer system is described. In some embodiments, the computer system comprises one or more processors and memory storing one or more program configured to be executed by the one or more processors. In some embodiments, the one or more programs includes instructions for: receiving, from a client system, data corresponding to an interaction with an extension; in response to determining that the extension is a first extension: selecting a first set of code that is associated with the first extension; and sending a first set of instructions to the client system over a secure channel established between an inline frame element and the client system, and wherein the first set of instructions is generated based on the data corresponding to the interaction with the extension and the first set of code; and in response to determining that the extension is a second extension that is different from the first extension: selecting a second set of code that is associated with the second extension, wherein the second set of code is different from the first set of code; and sending a second set of instructions to the client system over the secure channel established between the inline frame element and the client system, and wherein the second set of instructions is generated based on the data corresponding to the interaction with the extension and the second set of code.

In some embodiments, a computer system is described. In some embodiments, the computer system includes: means for receiving, from a client system, data corresponding to an interaction with an extension; means for, responsive to determining that the extension is a first extension: selecting a first set of code that is associated with the first extension; and sending a first set of instructions to the client system over a secure channel established between an inline frame element and the client system, and wherein the first set of instructions is generated based on the data corresponding to the interaction with the extension and the first set of code; and means for, responsive to determining that the extension is a second extension that is different from the first extension: means for selecting a second set of code that is associated with the second extension, wherein the second set of code is different from the first set of code; and sending a second set of instructions to the client system over the secure channel established between the inline frame element and the client system, and wherein the second set of instructions is generated based on the data corresponding to the interaction with the extension and the second set of code.

In some embodiments, a computer program product is described. In some embodiments, the computer program product comprises one or more programs configured to be executed by one or more processors of a computer system. In some embodiments, the one or more programs includes instructions for: receiving, from a client system, data corresponding to an interaction with an extension; in response to determining that the extension is a first extension: selecting a first set of code that is associated with the first extension; and sending a first set of instructions to the client system over a secure channel established between an inline frame element and the client system, and wherein the first set of instructions is generated based on the data corresponding to the interaction with the extension and the first set of code; and in response to determining that the extension is a second extension that is different from the first extension: selecting a second set of code that is associated with the second extension, wherein the second set of code is different from the first set of code; and sending a second set of instructions to the client system over the secure channel established between the inline frame element and the client system, and wherein the second set of instructions is generated based on the data corresponding to the interaction with the extension and the second set of code.

Executable instructions for performing these functions are, optionally, included in a non-transitory computer readable storage medium or other computer program product configured for execution by one or more processors. Moreover, details of one or more examples, implementations, and/or embodiments are set forth in the accompanying drawings and the description below. Other components, features, aspects, and potential advantages will be apparent from the description and drawings, and from the claims.

BRIEF DESCRIPTION OF THE FIGURES

For a better understanding of the various described embodiments, reference should be made to the Detailed Description below in conjunction with the following figures in which like reference numerals refer to corresponding parts throughout the figures.

DETAILED DESCRIPTION

Figure 1:
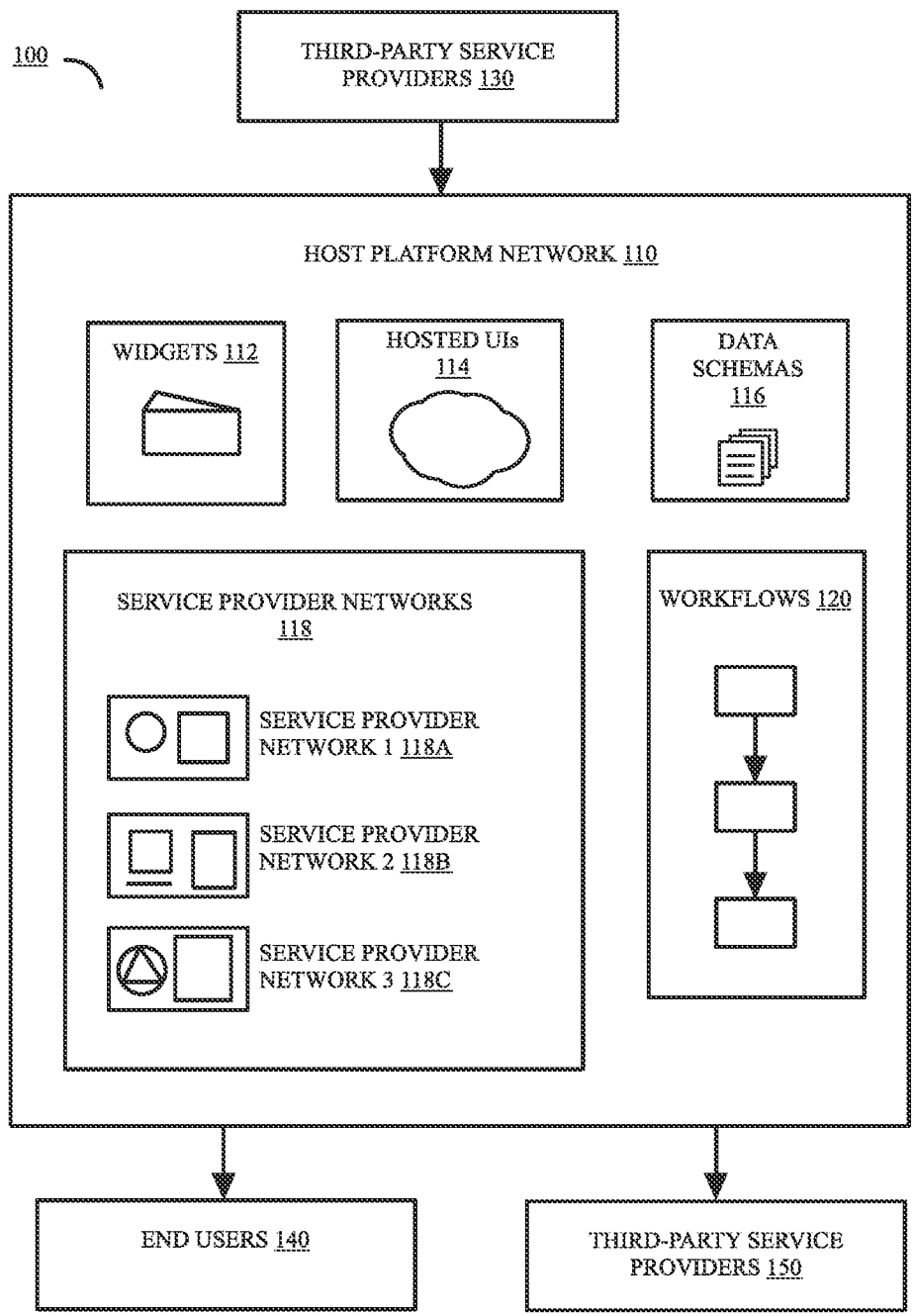
FIG. 1 is a block diagram illustrating the logical relationship between different entities that and components associated with a network ecosystem, in accordance with one or more embodiments.

The detailed description described below describes various examples with reference to the accompanying drawings. Some, but not all, examples are shown and described herein. Indeed, the examples can take many different forms and/or be augmented in many different ways. Accordingly, this disclosure should not be construed as limited to the examples set forth herein. Rather, these examples are provided so that this disclosure will satisfy applicable legal requirements.

Businesses today rely on software tools (e.g., applications, components, plug-ins, and/or the like) to run aspects of their operations. Such software tools are typically sourced by a group of software developers and maintained by a business or the group of software developers. However, a single software tool from a single group of software developers is rarely sufficient to perform all the functions needed by the business or its end users. It may be possible to combine third-party extensions, plug-ins, components, or ancillary software, but doing so can be labor intensive, complicated, and/or inefficient. Therefore, interoperability and/or integration are concerns for businesses because they provide user experiences for accessing shared data, automating processes, and additional functionalities that may not be provided by a single application. Poor interoperability and/or integration can lead to errors, a need for manual intervention, inefficiencies, delay, increased financial expenditure, and poor experience for the business's users (e.g., for a business user or customer if a portion of the software tool is part of a digital storefront).

Interoperability and integration are not the only factors that software tool users must consider. The security and/or privacy of business users' data (including customer data) is often another concern. Exposure of a business' data can result in financial consequences due to fraud or result in damage to customer relationships. Such data can include business information, information concerning one or more users of the business, payment information, account information, usage information, etc.). With software-as-a-service and cloud-based computing gaining widespread acceptance, much of a user's data can be transmitted between many locations and/or entities and stored remotely. As the number of software tools increases, particularly where each is managed by a different third-party provider, the number of entities that must be trusted to handle a business' data increases and the additional increase in the number of data exchanges leads to added security and/or privacy risks.

Therefore, demand exists for an ecosystem that allows businesses, applications, and functional services to integrate seamlessly with each other and/or to maintain better user experience across many different deployments. This can ensure the minimal and secure exchanging of (and/or access to) underlying sensitive data, such as business data and/or personal data associated with the business' customers.

The ecosystem can be built around functionality provided by a host platform that is associated with a trusted entity. In some embodiments, one or more resources of the host platform handles storage of data for processing by third-party applications, provides security and permissions-based access control to such data, and/or provides and maintains software development tools that enable third-party developers to develop applications that are compatible with the ecosystem. These software development tools can include software development kits (SDKs), application programming interfaces (APIs), data schemas, custom objects, software components, libraries, functions, routines, etc. that enable creation of modular applications that can work together. For example, a set of data sourced from one third-party entity can be used by application components of different entities (e.g., different third parties or the host platform). This is possible because of, for example, the host platform providing one or more data schemas that define how metadata is defined so that application components from different platforms can properly handle and/or process the set of data.

For such an ecosystem to be accessible to third-party developers (e.g., third-party service providers), mechanisms can exist that enable third parties to develop software tools that are compatible with the ecosystem and maintain the assurances regarding integration, user experience, and/or data integrity. A third-party developer may want to integrate their current application with other components, workflow steps, applications, and/or services from other third-parties or the host platform. Rather than having to look in lots of places or integrate all these pieces themselves via APIs, etc., the ecosystem can allow the third-party developer to go to a host platform network that exposes available integration options. The host platform network can allow third parties to set up their own networks (also referred to as "network-as-a-service") where another third-party developer (or other user) can find relevant components that can be integrated with a target application. A third-party network can be a third-party customized and/or curated version of the host platform network. Components within the third-party network can include branding and identify information for the third-party even though it is hosted by the host platform network.

Regardless of whether a network is managed by the host platform or by a third party, an end user sourcing components can know that the ecosystem is taking care of integration and/or data handling. This integration and/or data handling can be achieved due to the APIs, data schemas, and custom objects made available by the host platform. The host platform can also define, confirm, and/or enforce permissions for accessing data (e.g., stored by the host platform) by ecosystem components. For example, an application component for messaging customers can be permitted to access customer contact information but not a business' accounting data, even though both are stored by the host platform and associated with a user of the application component.

An example architecture is described herein for creating and deploying an ecosystem that meets some or all the criteria set forth above. Technical features of the architecture are addressed briefly below. It should be understood that the details discussed below are merely exemplary of architecture for creating and/or deploying an ecosystem that meets some or all the criteria set forth above, and other architectures could be used in addition to and/or in lieu of the architecture discussed below to create and deploy an ecosystem that meets some or all the criteria set forth above.

Various embodiments described herein make reference to one or more of the components of FIG. 1, which is explained in more detail below. FIG. 1 illustrates an example block diagram 100. The components illustrated therein can perform, alone or in any combination, one or more processes for implementing one or more aspects of an application exchange ecosystem that can enable one or more of the features described herein.

FIG. 1 is block diagram 100 that illustrates the logical relationship between different entities and components associated with an ecosystem for integrating such components with a host platform network, in accordance with one or more embodiments. FIG. 1 includes host platform network 110, representing infrastructure (e.g., hardware and/or software) associated with a host platform that supports the ecosystem. As shown, the host platform network 110 includes one or more widgets 112, one or more hosted user interfaces (UIs) 114, one or more data schemas 116, and one or more workflows 120. In some embodiments, a widget is one or more of an application or an application component. In some embodiments, a hosted user interface (UI) is one or more UI elements provided by and/or managed by the host platform. For example, a hosted UI element can be a pre-made UI element that end users 140 and/or third-party service providers 150 can integrate into their own application. As shown, end users 140 and third-party service providers 150 receive content from host platform network 110. An end user of end users 140 can be a party that uses (e.g., causes download, execution, and/or integration of) a component accessed via networks 110 or 118A-118C. A third-party service provider of third-party service provider 150 can be a party that uses (e.g., causes download, execution, and/or integration of) a component accessed through network 110 or 118A-118C into their own application (and can also be considered an end user in some scenarios). In some embodiments, a data schema describes the logical organization of one or more databases. In some embodiments, data schemas support the exchange of data between different applications or components running on the host platform and provides a uniform interface for controlling permissions based on schema (e.g., a shape of the data to be shared). In some embodiments, a workflow describes a set of steps for accomplishing a particular task. For example, these steps can be downloaded (e.g., as widgets, hosted UIs, data schemas) and implemented together on a third-party webpage or host platform. In some embodiments, data schemas also specify the permissions in which a third-party component or application can access data associated with a host or other third party component or application. In some embodiments, data schemas are used to determine data access by various applications on a per-user basis. Depending on the role of the user or organization, a data schema may specify that a second application cannot access data from a first application that has specific access permissions specified.

FIG. 1 additionally depicts service provider networks 118. These service provider networks 118 are networks that are managed by (e.g., created, curated by) one or more third-party service providers. This is the network-as-a-service concept discussed above. For example, a third-party service provider can be a software developer of tax preparation software tools. This software developer creates a tax preparation-related component that is compatible with the ecosystem (e.g., using software development tools provided by the host platform). This ecosystem-compatible component can be offered to end users 140 via the software developer's service provider network (e.g., 118A). An end user (e.g., 140) can also navigate to other service provider networks (e.g., 118B or 118C) to download other components that can be integrated with the tax preparation-related component. For example, the end user can download a business transaction tracking application from network 118B and a real estate expense tracking application component from network 118C. In this example, the business transaction tracking application integrates the tax preparation-related and business transaction tracking components so that data can be shared between them, and their functionality combined.

In some examples, the network-as-a-service offered by the host platform can handle one or more of the following functions: user account management, billing and licensing, and installer activation. User account management can include handling user account information (e.g., logins, account history, etc.). Billing and licensing can include billing users for software licenses, accepting payments, managing licenses and subscriptions, etc. Installer activation can include enabling licensed components accessed through the host platform network, configuring the components to work with the end user's system, connecting the components with other services or applications that the end user wants to integrate with, etc.

FIG. 1 additionally depicts third-party service providers 130 providing content into host platform network 110. Third-party service providers 130 can include the same or different third parties than third-party service providers 150. Third-party service providers 130 include third parties that make contributions to the host platform network 110. These contributions can be one or more widgets 112, one or more hosted UIs 114, one or more data schemas 116, one or more service providers networks 118A-118C, and/or one or more workflows 120. For example, a third-party service provider of third-party service providers 130 can be an entity that developed a single component that is made available to end users 140 and/or to third-party service providers 150 via host platform network 110. A third-party service provider can be a party that includes a component (from another third party) into their own service provider network and offers it to end users for integration with the service provider's application. For example, the third-party that manages network 118B (offering the business transaction tracking application) can also offer the tax preparation-related application component in network 118B. End users looking for a tax software tool compatible with the business transaction tracking application would see the tax preparation-related application component available for retrieval in network 118B.

FIG. 1 depicts service provider networks 118A-118C within host platform network 110. However, this depiction is not intended to be limiting in terms of how any components are stored, managed, etc., but are merely illustrated as logical relationships. In some embodiments, a service provider network is accessible via a host platform network. For example, an end user (e.g., 140) can access service provider network 118A by navigating within host platform network 110. In some embodiments, a service provider network is based on host platform network 110. For example, the service provider network is hosted by a third-party service provider but is built based on components of host platform network 110. In some embodiments, third-party service provider components and applications are hosted by the host platform network and have been verified and approved for submission to the host platform network.

Figure 2:
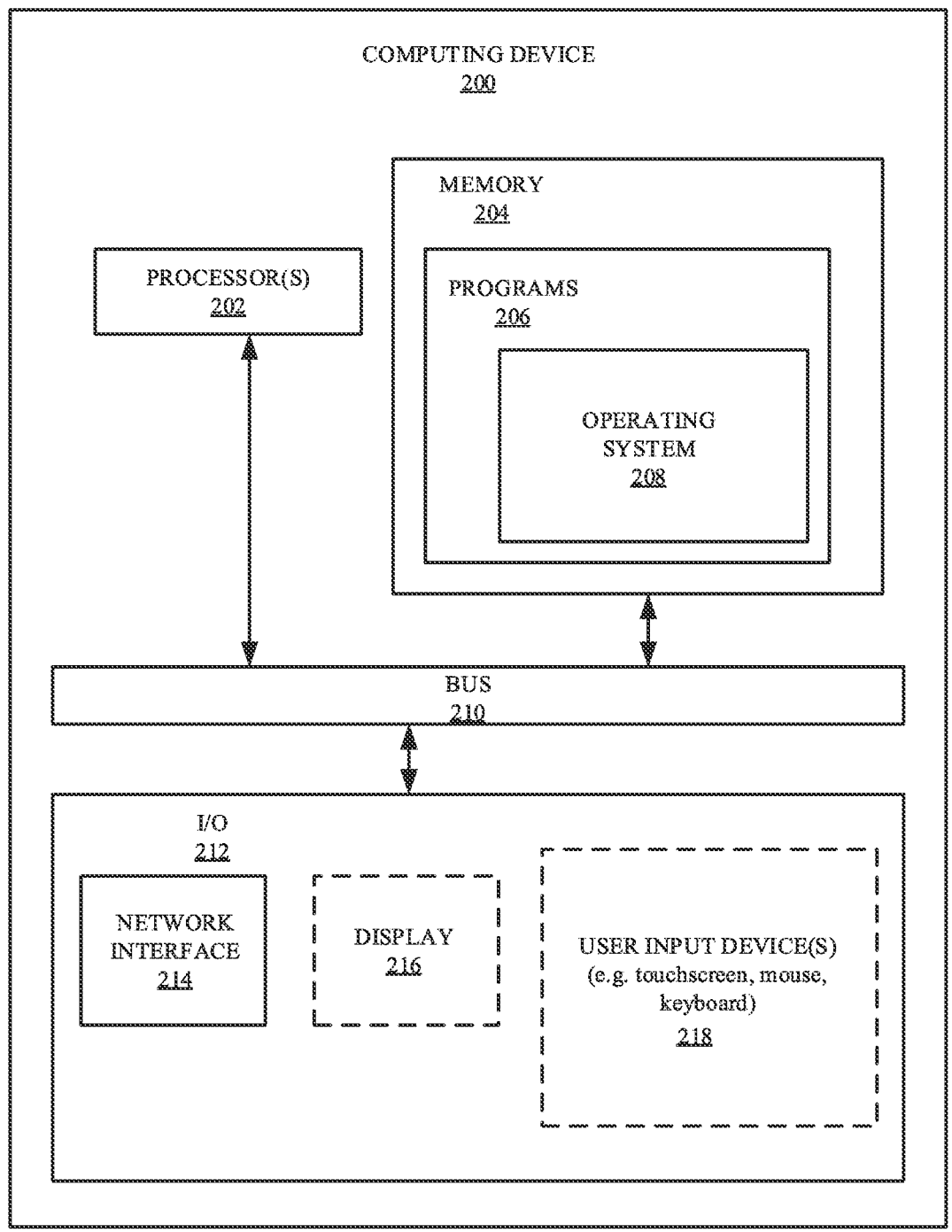
FIG. 2 is a block diagram of a computing device that implements one or more processes in accordance with one or more embodiments described herein.

FIG. 2 illustrates an example computing device 200 (alternatively referred to as computing system 200, computer system 200, system 200, electronic device 200, and/or device 200) that can be used to support and/or implement the architecture and operations in accordance with one or more embodiments described herein. It will be apparent to those of ordinary skill in the art, however, that other alternative systems of various system architectures can also be used. For example, the other alternative systems can be a computing system with fewer, different, and/or additional components than those illustrated in (and/or described in relation to) FIG. 2 or a computing system including one or more devices 200 as illustrated in FIG. 2. In some embodiments, computing device 200 is a general-purpose computer. In some embodiments, computing device 200 is a special purpose (e.g., application specific) hardware device.

Computing device 200 illustrated in FIG. 2 includes one or more bus (or other internal communication component) 210 for communicating information and one or more processors 202 coupled to the bus 210 for processing information. Device 200 includes memory 204 coupled to bus 210. Memory 204 can include random access memory (RAM) or other volatile storage device 204 for storing information and instructions to be executed by one or more processors 202 and/or for storing temporary variables or other intermediate information during execution of instructions by one or more processors 202. Memory 204 can also include non-volatile memory storage, such as read-only memory (ROM) and/or a static storage device for storing static information and instructions executable by processors 202, and one or more data storage devices such as a hard disk (e.g., magnetic disk), flash memory storage, or optical disk and its corresponding disk drive. This data storage device can be coupled to bus 210 for storing information and instructions. For example, memory 204 can store programs 206 in non-volatile memory. In some embodiments, the programs include one or more sets of computer-executable instructions for execution by the one or more processors 202. When ready for execution, the instructions are loaded into volatile memory and passed the processors for execution. The programs 206 can include an operating system 208 for managing the computing device's basic functionality, such as scheduling tasks, executing applications, and controlling peripheral devices. As used herein, the term "program" or "computer program" are considered synonymous with "application," "computer application, or "application component" unless otherwise stated in the context in which the term is used.

Computing device 200 can also include one or more input/output (I/O) components 212. FIG. 2 illustrates several example I/O components grouped together within I/O components 212 for illustration purposes only, and each such component therein does not necessarily need to be located together, or within a part of computing device 200. For example, an I/O component 212 can be an external device coupled to an interface of computing device 200. Computing device 200 can include network interface 214 for handling uplink and/or downlink communications with one or more other devices. The network interface 214 can itself be a communication device and can include any of a number of commercially available networking peripheral devices such as those used for coupling to an Ethernet connection, Wi-Fi connection, 3GPP mobile communication protocol (e.g., 3G, 4G, LTE, 5G, NR, and/or the like), and/or the like, to communicate over the Internet, a wide area network, a local area network, an ad-hoc (device-to-device network), or the like. Network interface 214 can be a modem connection, and/or any other mechanism that provides connectivity between the computing device 200 and one or more other devices. Note that one or more of the components of this system illustrated in FIG. 2 and associated hardware can be used in various embodiments as discussed herein.

Computing device 200 can optionally be coupled to display device 216, such as a light emitting diode (LED) display or a liquid crystal display (LCD) (e.g., coupled through bus 210 for displaying information to a user of computing device 200). Display device 216 can be integrated into computing device 200 (e.g., a touchscreen of a smartphone) or be external to computing device 200 (e.g., an external display coupled via a cable with device 200).

Computing device 200 can optionally include one or more user input device(s) 218, such as an alphanumeric input device (e.g., keyboard), a cursor control or other input signaling device (e.g., a touch-sensitive display (touchscreen), a touchpad, mouse, a trackball, stylus, or cursor direction keys) for controlling cursor movement and/or selection on a user interface displayed using display device 216.

In some embodiments, computing device 200 is a server or system of servers. For example, the server can be a collection of one or more computer hardware machines working together to perform processes and tasks described with respect to computing device 200. Thus, computing device 200 can be considered a logical construct, and references thereto can and should be interpreted as encompassing scope that includes computing device 200 being comprised of one or more computing devices (e.g., as device 200 is described) or several devices that together behave as computing device 200 has been described. As one of skill would appreciate, there is no requirement express or implied herein that the components of computing device 200 be dedicated or physical resources, or that the components must be located physically together. Rather, computing device 200 can be embodied in one or more virtual machines and/or certain functional components of computing device 200 can be remote from other functional components of device 200.

Figure 3:
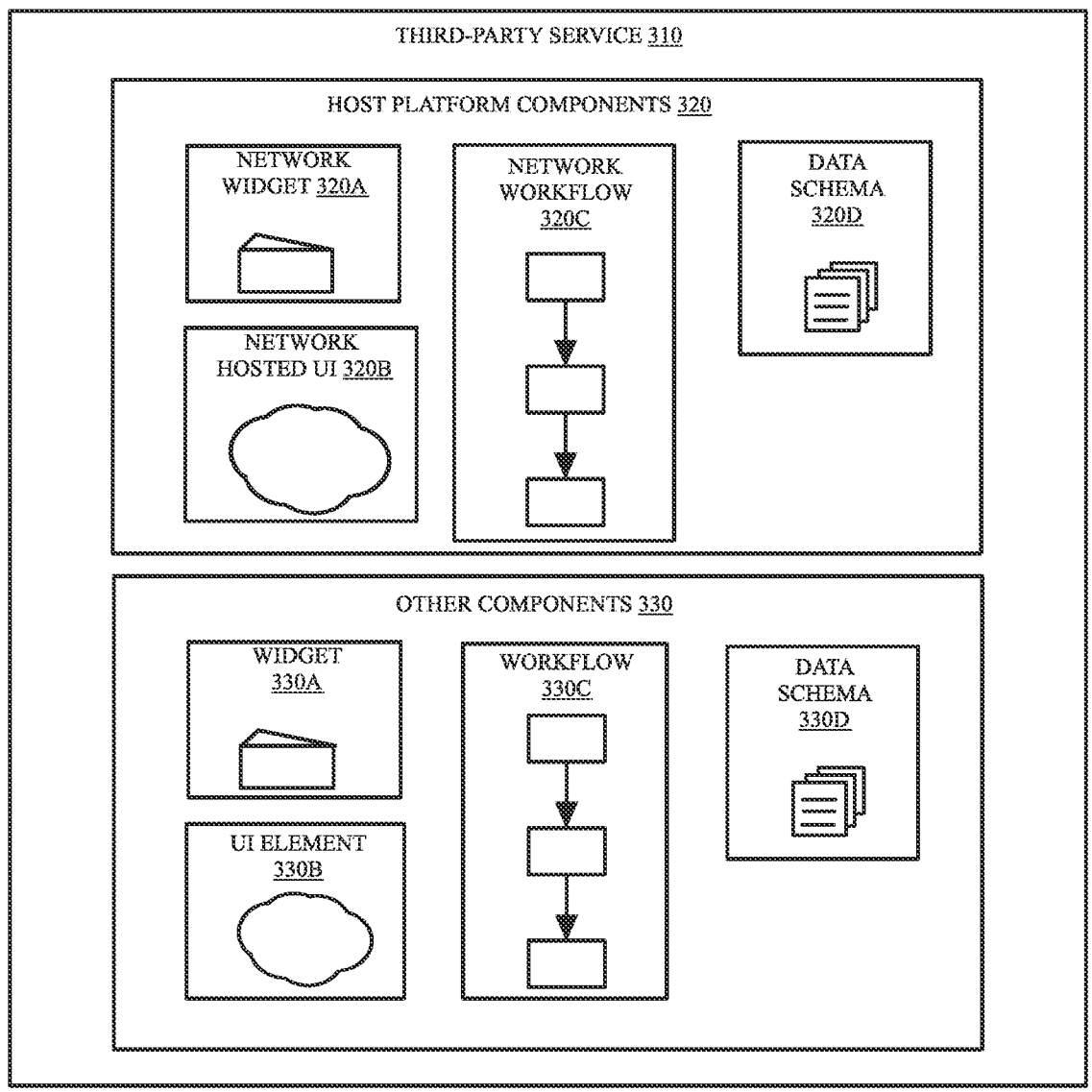
FIG. 3 is a block diagram showing an example service deployed using network components in accordance with one or more embodiments described herein.

FIG. 3 illustrates block diagram 300 illustrating the logical components of an example third-party service 310, in accordance with one or more embodiments. It should be recognized that more or fewer components and/or different components can be included in third-party service 310. A third-party service (e.g., 310) can be an application and/or a webpage. In this example, third-party service 310 is an application that includes both host platform components 320 and other components 330. For example, continuing with the example described with respect to FIG. 1, third-party service 310 is a business transaction tracking application. The business transaction tracking application includes host platform components 320 sourced from host platform sources (e.g., host platform network 110 or service provider networks 118) and integrated into the application and other components 330 sourced from the third-party separate from the host platform sources. In some embodiments, the integration of these components together is due to customization by an end-user. In other embodiments, the integration is performed by a third-party service provider (e.g., 150). Host platform components 320 include network widget 320A, network hosted UI 320B, network workflow 320C, and data schema 320D. For example, widget 320A can be an application component that arranges transaction data for presentation as a spreadsheet. Network hosted UI 320B can be a user interface element displayable by the application for receiving a user input command to refresh the transaction data from a server. Network workflow 320C can be a series of steps (e.g., functions and interfaces) that an end user of the application uses to select a transaction, choose to refund a transaction, receive a verification credential for authorizing the refund, and submit the refund for processing. Data schema 320D can be a data schema that describes how the business tracking application stores transaction data, so that such data can be read by other services.

As mentioned above, the example business transaction tracking application represented by third-party service 310 also includes other service platform components 330 not sourced from host platform sources (e.g., host platform network 110). For example, other service platform components 330 can include components not sourced from the host platform ecosystem, such as those that are developed by the third-party themself or sourced from another third party but not via a service provider network (e.g., 118A-118C).

Other service platform components 330 include widget 330A, UI element 330B, workflow 330C, and data schema 330D. For example, widget 330A can be an application component that adds support for foreign languages in interfaces of the application. UI element 330B can be a user interface element displayable by the application for providing an interface of a search feature. Workflow 330C can be a series of steps (e.g., functions and interfaces) sourced from an open-source repository that an end user of the application uses to select displayed data, take a screenshot by the application, activate an email client, and send the screenshot via the email client. Data schema 330D can be a data schema that describes how the business tracking application stores transaction data, so that such data can be read by other services.

In accordance with some embodiments, the architecture described above can allow developers to build and/or distribute modular applications that are built on a common ecosystem platform. This ecosystem stands in contrast to some legacy models of software tool development and distribution, such as (1) proprietary silos of vertically integrated components that lead to customers being "locked-in" to a set of software that may not meet all of their needs and/or (2) custom development of software solutions for integrating multiple software tools by different developers which requires development time, resources, and ongoing support.

With the above ecosystem framework in mind, attention is now turned towards techniques for deploying an extension (which can also be referred to as an application extension, an extension to an application, a plug-in, and/or an add-on). As used herein, an extension refers to a component that is used in conjunction with another component. As described above (and hereby incorporated), a component can include one or more of an application, an application component (e.g., a portion of an application), a hosted UI, a widget, a workflow, and/or a data schema, or the like. In some embodiments, used in conjunction with means that the two components operate such that at least one component depends on another (e.g., for data to complete a function; for activation; for controlling manner and location of display of user interface associated with the component). The extension can be the component that depends on the other component. In some embodiments, the extension adds functionality to the other component. In particular, such functionality can include addition or availability (e.g., for optional addition) of user interface elements of the extension to one or more displayed user interface of the other component.

Notably, the examples shown and described with respect to FIGS. 4 and 5A-5C involve a scenario in which a business user utilizes a web interface (also referred to as a webpage dashboard) that is built using the ecosystem as described above. That is, the webpage dashboard can be hosted by the host platform and built from components developed by the host platform (or other third parties that comply with the ecosystem). The webpage dashboard is used by the business user to view and/or interact with data stored by (or otherwise made available to) the host platform and/or with data stored elsewhere by one or more components of the webpage dashboard. Such data can be accessed using data schemas and permissions as described herein. In these examples, the business user wants to add extensions (e.g., 402A and 402B) to extend the functionality of their webpage dashboard. In this example, the extensions add user interface elements to the webpage dashboard. A user interface element as used herein refers to a displayable graphical user interface component (e.g., a graph, a table, an interactive GUI, or the like). Rather than build the extension themselves, the business user can source the extension from ecosystem components available via a host platform network and/or a service provider network. These extensions can provide seamless integration (e.g., plug-and-play) as the ecosystem-defined characteristics are used to automatically handle, for example, rendering and displaying user interface elements, retrieving needed data from an appropriate data source, validating permissions, and/or performing secure communication.

As descried in detail above, a "network" can allow access to and selection of extensions that are compatible with other components of the ecosystem, like a marketplace or store for components. A network as used in this way can alternatively be referred to as a component network. Examples of a network as used here can include a host platform network (e.g., 110), a third-party network, a service provider network (e.g., 118A-118C) as described above, and/or any other mechanism(s), infrastructure(s), and/or user interfaces that allow access to and selection of components. In some examples, a host platform network (or a service provider network within the ecosystem) provides the ability for business users to install different extensions. In such examples, upon a business user requesting to install an extension, the extension can be installed (e.g., enabled, configured, made available) as an extension to the webpage dashboard. Once installed, the business can customize and build their dashboard experience and/or an experience of their customer using the extension. The user interface associated with the extension can be branded to match the user's existing user experience (e.g., dashboard experience and/or customer-facing experience) automatically (e.g., without needing a developer to modify or customize).

Figure 4:
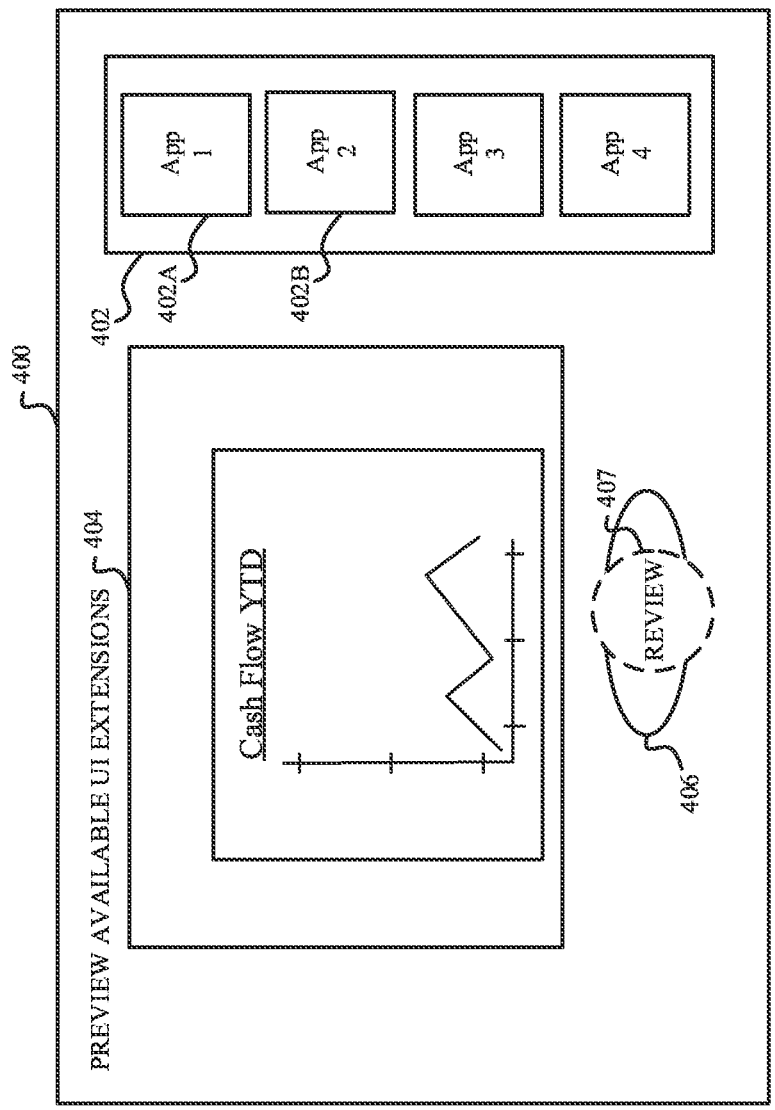
FIG. 4 illustrates an example user interface for selecting an extension in accordance with one or more embodiments described herein.

FIG. 4 illustrates an example user interface 400, in accordance with one or more embodiments. User interface 400 represents a user interface for selecting one or more extensions. User interface 400 is used to illustrate an example scenario in which a user can select from, preview, and/or install one or more extensions (e.g., applications, components, hosted UIs, and/or widgets) that can integrate with a client application. The client application can refer to an application (or other component) that will incorporate the functionality of the extension. For example, it can be a browser application (e.g., displaying a webpage dashboard), an application running on a server (e.g., serving a thin client displaying the webpage dashboard), or the like. Thus, though referred to as an application in this example, the scenarios described herein are also applicable to a webpage or web-connected application that allows user interaction (e.g., using a webpage platform). User interface 400 includes area 404 (e.g., for displaying user interface associated with an extension), review icon 406 (e.g., for selecting an extension), and extension selection area 402, which includes multiple icons (e.g., 402A and 402B) each corresponding to an available extension (e.g., App 1 and App2). In this example, user interface 400 is a user interface of a network for selecting one or more extensions and can include one or more of the features described above with respect to a host platform network (e.g., 110) and/or a service provider network (e.g., 118A-118C). Using user interface 400, the user can integrate one or more extension into user interface 400 (e.g., a webpage dashboard).

In the example of FIG. 4, a third-party service provider (e.g., a business) is a vendor of a vehicle-based sightseeing tour business named "Rocket Rides". A user (e.g., a business manager) associated with the third-party service provider (also referred to as the business) wishes to add an extension to a user interface 500 (representing a webpage dashboard) that the user utilizes to manage the Rocket Rides business. FIG. 4 illustrates the user previewing the extension 402A referred to as "App 1", displayed in extension selection area 402. Though referred to as an "App" in the figure, it should be recognized that it can be any component described above (e.g., application, component, hosted UI, widget, or the like). Area 404 includes a preview of the user interface element(s) that the selected extension App 1 402A will cause to be displayed. As can be seen, App 1 402A is an extension that causes output of a visualization of cash flow year-to-date (YTD) (e.g., income minus expenses). The extension would require access to income data and expense data for the current year in order to perform its function (e.g., generate a graph). In FIG. 4, the preview is based on example data (e.g., not associated with Rocket Rides). In some embodiments, the preview is based on actual data from the user account (e.g., of Rocket Rides). If actual data is used, permissions can be checked and/or authorization/consent given by a user to share such data with the extension.

In some embodiments, area 404 is a preview window that displays a user interface associated with the selected extension (e.g., selection of extension represented by icon 402A), and a subsequent selection (e.g., user input 407) causes the extension to be made available to the client application (e.g., installed, enabled, and/or downloaded). In some embodiments, the selection of the extension and/or the subsequent selection can cause user interface 400 to be replaced, modified, or overlaid upon on the display. For example, after the user selects extension icon 402A and then review icon 406 (e.g., using user input 407), user interface 400 is replaced with another user interface (e.g., user interface 500 of FIG. 5 representing a webpage dashboard) of the client application. This other user interface can be affected by the executed selected extension associated with 402A, such as by having added functionality, a new presentation of data, or the like, depending on what the extension is programmed to do.

Figure 5A:
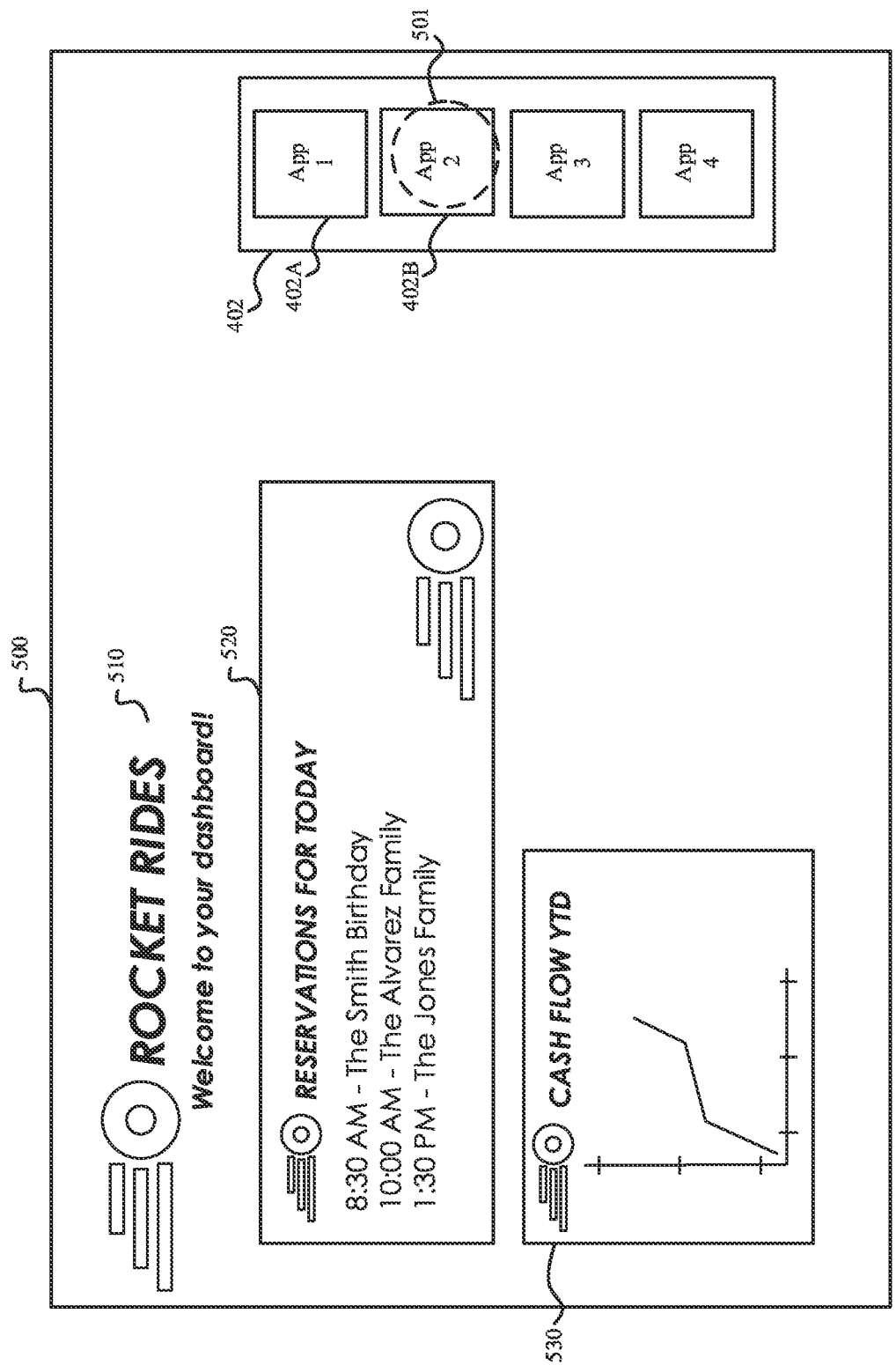
FIGS. 5A to 5C illustrate example user interfaces that include user interface elements associated with extensions in accordance with one or more embodiments described herein.

FIG. 5A illustrates an example user interface 500. User interface 500 represents a webpage dashboard for the business Rocket Rides as identified by header 510. Header 510 includes styles and branding associated with Rocket Rides (e.g., wheel logo, font, and text styles). In this example, a user (e.g., business manager) logs into their account and is presented with user interface 500. In some embodiments, a user interface (e.g., webpage dashboard) is customizable. Some components can be developed by the business themselves (which are also referred to herein as "native" components or "native" extensions). For example, user interface 500 includes a native extension that outputs native user interface element 520, the native extension being a software widget that interacts with Rocket Rides' reservation data to display the current day's customer reservations. In this example, the extension is considered native because it is developed by Rocket Rides for their webpage platform. In this example, Rocket Rides developed the reservation tracking extension that displays user interface element 520 using ecosystem tools (e.g., as described above). In some embodiments, the user can customize their user interface (e.g., webpage dashboard) with third-party extensions (e.g., available via a host platform network that is part of the ecosystem). These third-party extensions can be referred to as "non-native" components. In integrating these components, the user would like them to share appearance and/or style attributes with native components, and thus feel native to the user interface (e.g., webpage dashboard).

FIG. 5A provides an illustration a user interface 500 that includes a native extension (associated with user interface element 520) and a non-native extension (associated with user interface element 530). In FIG. 5A, the user has selected and added (e.g., using user interface 400) the App 1 402A extension to their user interface 500. As shown, user interface element 530 depicts a visualization of the cash flow YTD for the Rocket Rides business. User interface element 530 is configured such that its user interface (that is displayed) can be automatically adjusted (e.g., by the client application) to conform to appearance and/or style characteristics of the user interface 500. As shown, the title "CASH FLOW YTD" is in the same font style (e.g., Century Gothic font, bold, italic) as header 510, and also includes the Rocket Rides brand logo. Standing in contrast, the cash flow YTD chart in user interface 400 of FIG. 4 has a different appearance (font is different, does not show Rocket Rides logo) and is based on different (e.g., example) data. Thus, user interface element 530 appears native to the user interface 500, even though it is developed and published by a third-party service provider.

At user interface 500 of FIG. 5A, the user can add an additional extension to add more functionality to their dashboard. The functionality includes a user interface for contacting customers with reservations on today's date, to keep them informed of any disruptions in service. In some embodiments, a user interface (e.g., user interface 500) of a client application includes one or more user interfaces for selecting extensions. For example, in FIG. 5A, user interface 500 includes extension selection area 402. In this example, extension selection area 402 includes multiple available extensions and maintains the same appearance as in FIG. 4 (e.g., an extension "drawer" or "ribbon" that is displayed on the right edge). Application selection area 402 in FIG. 5A can include the same or different sets of extensions (e.g., a subset) as application selection are 402 in FIG. 4. As an example, the extensions shown in application selection area 402 in FIG. 5A can be a subset consisting of extensions that a user has selected, using user interface 400 in FIG. 4, to make available to user interface 500 (e.g., therefore these extensions are pre-installed). In FIG. 5A, user interface 500 receives user input representation selection (e.g., user input 501) of App 2 402B.

Figure 5B:
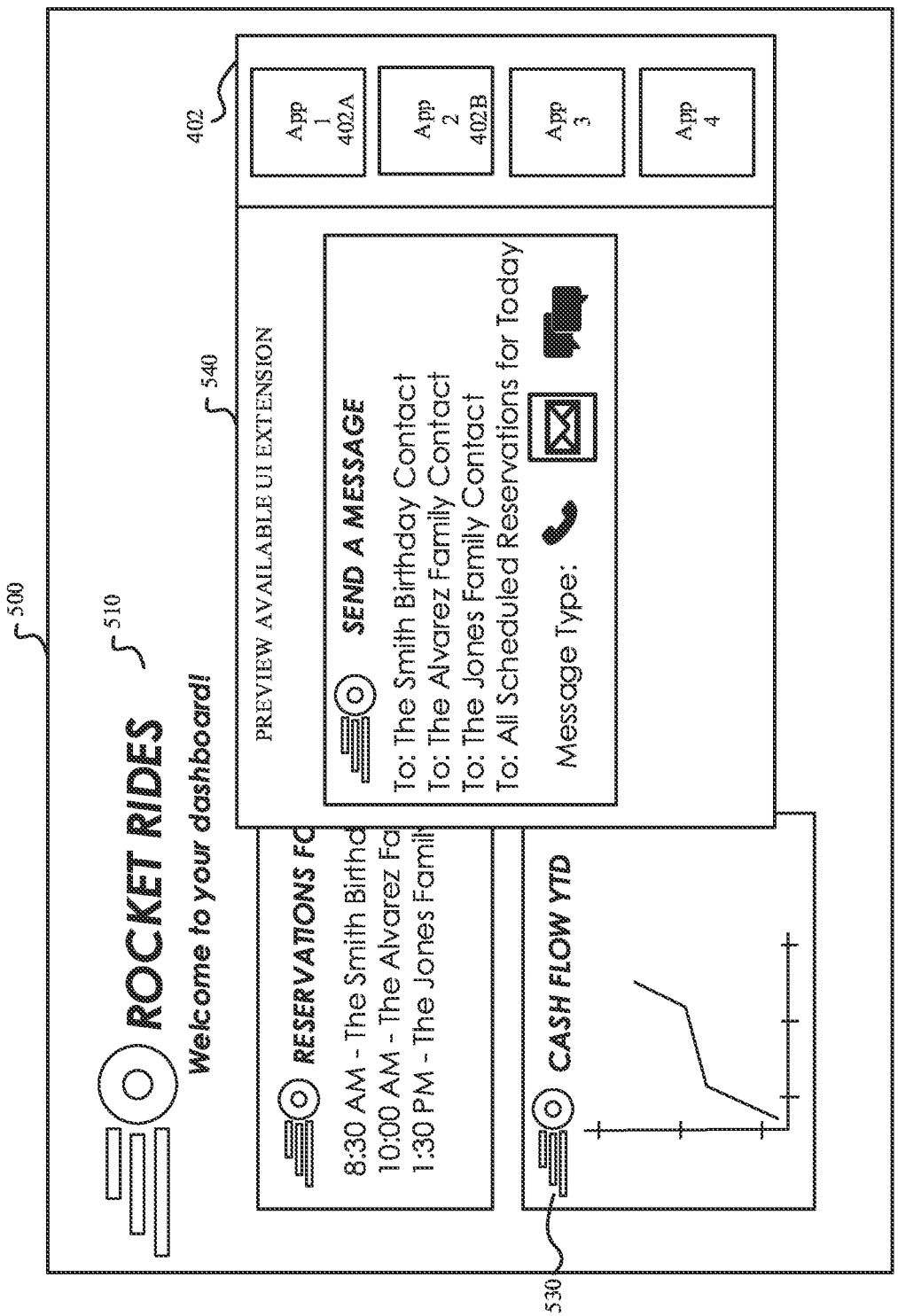

FIG. 5B illustrates an example user interface 500 with an example user interface element 540. The user has added user interface element 540 by virtue of selecting the extension represented by App 2 using user input 501. User interface element 540 is associated with the extension App 2 and is a user interface for contacting the customers associated with today's reservations. In some embodiments, a user interface element associated with an extension (also referred to as a user interface element) is displayed in its own window or area with or without being overlaid on existing content (e.g., existing user interface is not reflowed or adjusted). As shown, user interface element 540 is overlaid on portions of user interface 500 (which remains unchanged otherwise, but can also be dimmed, shaded, and/or de-emphasized). User interface element 540 includes content that is based on Rocket Rides custom data. For example, as shown in user interface element 520 of FIG. 5A, the Rocket Rides business has 3 reservations scheduled for today: an 8:30 AM with The Smith Birthday, a 10:00 AM with The Alvarez Family, and a 1:30 PM with The Jones Family. As a result, user interface element 540 includes options to message each of today's reservation holders individually (e.g., To: The Smith Birthday's contact), or collectively (e.g., "To: All Scheduled Reservations for Today"). User interface element 540 also includes options to select the type of message to send to a customer: e.g., a phone call, an email, or a live chat.

Figure 5C:
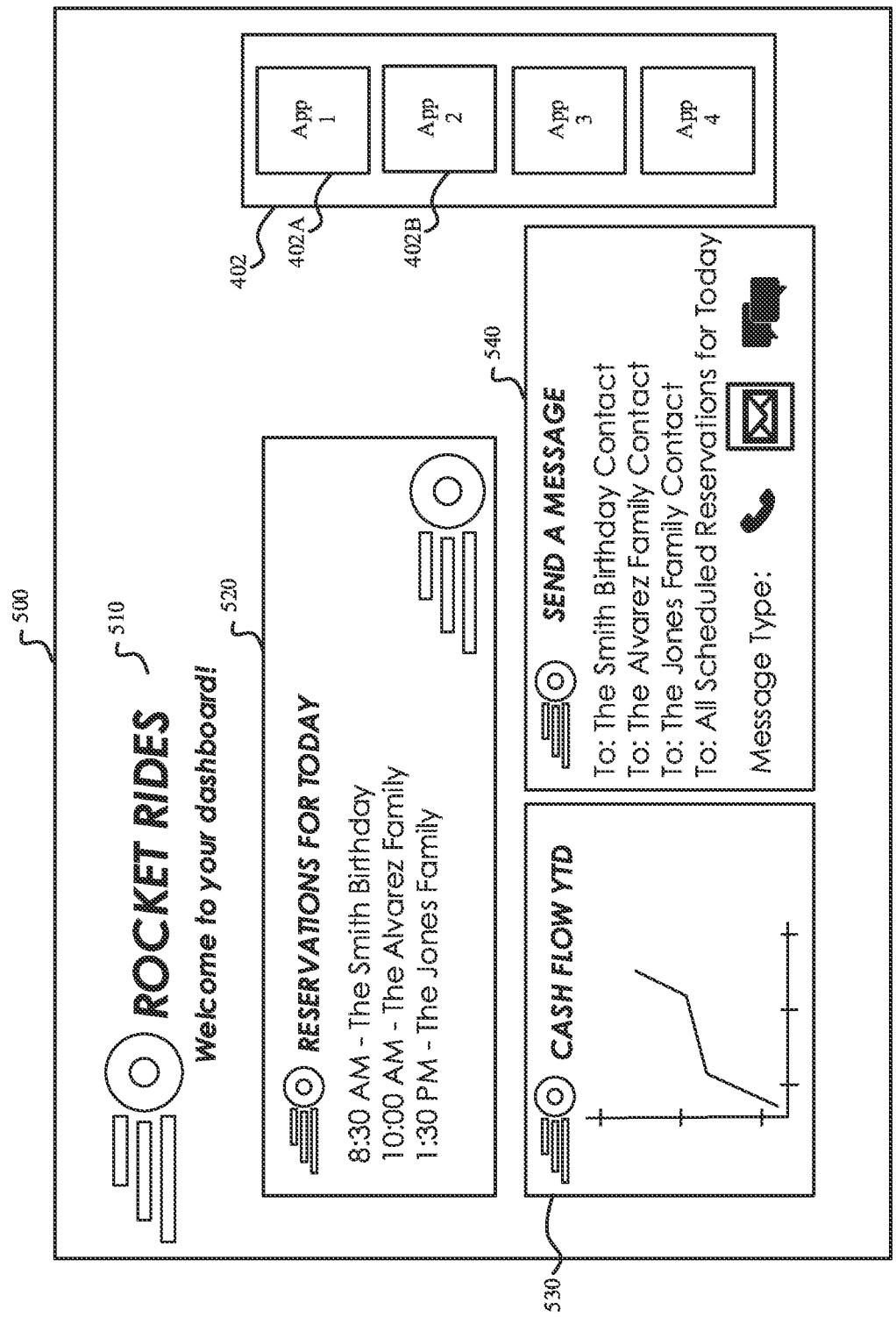

FIG. 5C illustrates an example user interface 500 with an example user interface element 540 depicted as part of the layout of user interface 500, representing an alternative and/or additional way for a user interface element associated with an extension to be integrated. In FIG. 5C, in response to user input 407 at FIG. 5A, the user interface element 540 is caused to be displayed as shown. In FIG. 5C, user interface element 540 is displayed as an integrated portion of user interface 500 (rather than as a pop-up window/overlay as in FIG. 5B). In some embodiments, the location of a user interface element and/or integration of the user interface element into a client application/webpage (e.g., dashboard) can be one or more of an overlay (e.g., as in FIG. 5B) or an integrated portion of existing user interface (e.g., as shown in FIG. 5C). In some embodiments, how the user interface element associated with an extension is integrated (e.g., location, position, overlaid or placed in existing user interface, etc.) depends on one or more of: user configuration (e.g., user chooses), developer configuration (e.g., developer chooses and sets configuration controlling how extension is displayed), one or more characteristics of the device displaying the user interface element (e.g., devices with smaller display areas integrate extensions into existing user interface; devices with larger display areas display extensions as an overlay), and/or one or more characteristics (e.g., inputs, outputs) of the extension (e.g., if the extension is used to enable a discrete action (e.g., add this customer to the company mailing list) that is not configured to continually read data and update a displayed portion (e.g., a cash flow chart) then it may be displayed as an overlay).

The user interfaces described above for selecting and executing an extension can be used in conjunction with at least some of the mechanisms described earlier related to the ecosystem. For example, permissions to access certain data can affect an extension's ability to carry out an action. Thus, if the extension cannot access data required for performing an action, then it cannot perform that action. Notably, data can be stored in multiple locations. For example, there can be a host platform database, a vendor (e.g., Rocket Rides) database, and other third-party databases that each provide data to one or more extensions represented in a user interface (e.g., user interface elements associated with the extensions displayed in a webpage dashboard). As noted before, permissions can be based on one or more of user role, organization identity, extension identity, or the like.

In some embodiments, approval of an extension is determined. In some embodiments, this approval is required and/or performed at one or more of: selection of the extension, activation of the extension, installation of the extension, user interaction with of the extension, and/or in response to a request to perform an operation of the extension (e.g., access a set of data that it needs to function). The approval can be determined at least in part by a permission setting associated with the extension (e.g., permission (or lack thereof) to access the set of data). For example, an extension that relates to messaging customers can lack permission to access a payment data field-thus, an operation of the extension is not approved (e.g., denied) when the operation and/or extension requests such payment data (e.g., from the business transaction tracking application or a host platform server). In some embodiments, approval of an extension to perform an operation can be determined at least in part by a permission setting associated with the client application (e.g., associated with the client application that causes display of the user interface 500). For example, where a client application is instead a customer messaging application and the extension is a business transaction tracking extension, the extension can be denied access to perform an operation using a payment data field due to the client application (e.g., that is integrating the extension) not having permission to access the payment data field. Implementing permissions such that components (e.g., applications, widgets, hosted UIs, extensions) that are integrated need permission for an operation and/or accessing a set of data can protect such data from being accessed by an extension that lacks permission but is integrated with a component that does have permission.

In some embodiments, a set of instructions is selected in response to an interaction with an extension. The selected set of instructions can be based on the selected extension (e.g., code associated with the extension) and/or data corresponding to the interaction (e.g., a user input command). For example, in response to receiving a user selection of icon 402A (App 1) in user interface 400, instructions based on the extension named App 1 are sent to the client application (e.g., the browser displaying user interface 500). As shown in FIG. 5A, after selection of App 1 402A in FIG. 4, user interface 500 uses these instructions to cause display of user interface element 530. If the user selects icon 402B in user interface 400, instructions based on the extension named App 2 are sent to the client application. As shown in FIGS. 5B and 5C, after selection (e.g., user input 501) of App 2 402B in FIG. 4, the user interface 500 uses these instructions to cause display of user interface element 540 with user interface 500. As an example, a client application (that displays user interface 400 and/or user interface 500) is a business transaction tracking application used by Rocket Rides as mentioned above, and a user selects 402A corresponding to an extension that provides a graph visualization of the year-to-date cash flow of the business. In response to selection of 402A, a host platform server can send a set of instructions that are generated based on the code associated with (e.g., required for executing) App 1 and the income and expense business data (e.g., from a database, subject to permissions). As another example, the client application is the business transaction tracking application used by Rocket Rides as mentioned above, and a user selects 402B corresponding to an extension that provides an interface for sending messages to customers associated with a reservation with Rocket Rides. In response to selection of 402B, a host platform server can send a set of instructions that are generated based on the code associated with App 2 as well as needed business data (e.g., from a database, subject to permissions) identifying today's reservations and the name and contact information of the associated customers.

Figure 6:
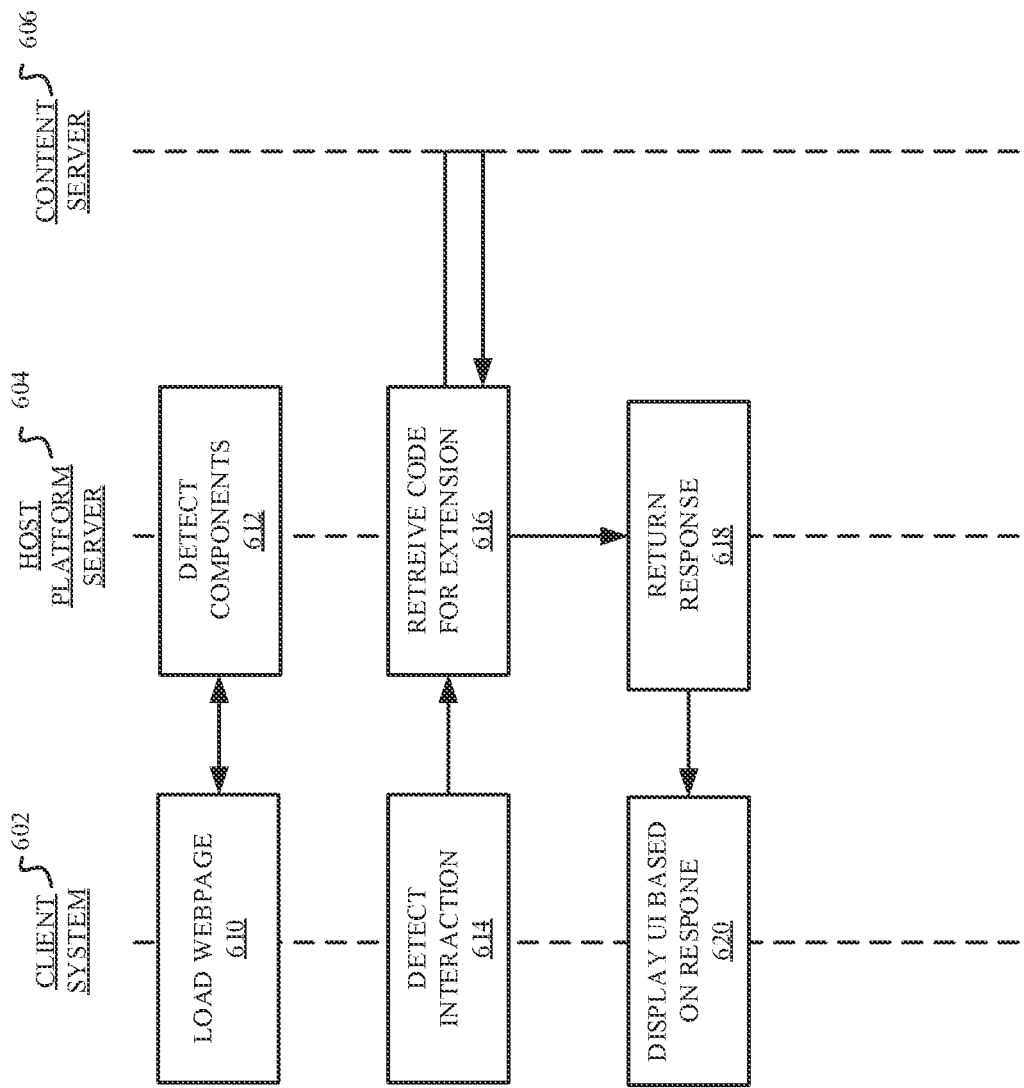
FIG. 6 is a flowchart of operations associated with deploying an extension in accordance with one or more embodiments described herein.

FIG. 6 is flow diagram 600 illustrating operations and communications performed by client system 602, host platform server 604, and content server 606. Client system can be a device that includes one or more features of computing device 200. For example, client system 602 is a device that includes a client application (e.g., a web browser client used to display user interface 400 and/or user interface 500). In some embodiments, the client application is a thin client (e.g., executing on a thin client device) that relies on host platform server 604 and/or client system 602 for processing. For example, if the client application is a thin client that relies on client system 602, client system 602 can be an intermediate server between client application and the host platform server 604 (thus, the client system is not necessarily the host platform server). Host platform server 604 and/or content server 606 can include one or more features of computing device 200. For example, host platform server 604 and/or content server 606 can include one or more servers and/or databases managed and/or associated with a host platform of the ecosystem. In some embodiments, host platform server 604 and content server 606 are the same server or system of servers. In some embodiments, content server 606 is one or more third-party servers, different from the host platform.

At block 610, client system 602 loads a webpage. For example, client system 602 loads a webpage (e.g., user interface 500) using the client application, wherein the webpage includes a user interface for managing a business (e.g., Rocket Rides). In some embodiments, as part of loading the webpage, client system 602 requests and receives the webpage content via host platform server 604. At block 612, host platform server 604 detects components that are needed by the client application in order to load the webpage. For example, the application may require use of one or more components (e.g., application components, hosted UIs, widgets) (e.g., user interface element 520 and/or user interface element 530) that are configured to appear in a user interface of the application (e.g., user interface 500). In some embodiments, such detection occurs while client system loads the webpage, such as in response to host platform server receiving a request for the webpage and/or application content. In response to detecting the components used by the webpage, the host platform server can take an action and/or cause such action to be taken by the client system. Such action can include providing content (e.g., code, instructions, user interfaces and associated graphical assets, or the like) needed by (e.g., requested by) the client system and/or client application for loading the webpage. Such action can also include loading and/or executing, on the host platform server, one or more component, application, and/or other process for supporting and/or providing functionality of the client application for the client system (e.g., if the client application is a thin client, then data processing can occur on the client system 602 and/or host platform server 604).

At block 614, client system 602 detects interaction with an extension. In some embodiments, the interaction represents a request to activate the extension (e.g., for use with the client application). For example, user input 407 selecting extension 402A is detected. As another example, user input 501 selecting extension 402B is detected. In some embodiments, activation can include a request to add the extension to the client application (e.g., where it was previously not included) and/or a request to perform an action using an extension already associated with the client application (e.g., extension is available in a displayed extension drawer or otherwise available for selection but is not currently executing). At block 616, host platform server 604 retrieves code for the extension. For example, the extension can include executable code and this code is retrieved from a content server. As illustrated in FIG. 6A, host platform server 604 retrieves data from content server 606, which can include the code associated with the extension. In some embodiments, the code is retrieved from storage on the host platform server 604. In some embodiments, other data related to the extension is retrieved (e.g., media assets, stored data) and/or provided to the client system 602 by the host platform server 604. As discussed above, data retrieval can be subject to permissions of the client application, the extension, and a user account.

At block 618, host platform server 604 returns a response to client system 602. The response can include instructions to client system 602. These instructions can instruct client system 602 what to display and/or instruct client system 602 on how to execute the extension. In some embodiments, the instructions include the code. In some embodiments, the instructions are based on the code. In this example, host platform server 604 executes the extension, processes the necessary data, and transmits back instructions to client system 602 to display instructions. In some examples, the instructions are sent back to client system 602 to enable client system 602 to load and/or otherwise execute the extension. At block 620, client system 602 displays a UI based on the response (e.g., instructions) received from host platform server 604. For example, client system 602 displays (or causes display of) the user interface element in area 404 of FIG. 4 using the response received in the response from host platform server 604. As another example, client system 602 display (or causes display of) user interface element 530 and/or user interface element 540 in user interface 500 of FIG. 5 using the response received in the response from host platform server 604.

Discussion now turns to an example communications flow between a host platform server (e.g., 604) and a client application (e.g., of user interface 400) that includes an inline frame element, and optionally a content server (e.g., 606). A set of communications between these listed components can ultimately result in a rendered version of an application that includes an extension that causes display of one or more user interface element in accordance with some embodiments. In some embodiments, a user interface element includes one or more features of an embedded UI element as described herein. A host platform server can include one or more features of computing device 200 as described herein. The client application can include one or more features as described above with respect to the client application that displays user interface 400 of FIG. 4 and/or user interface 500 of FIGS. 5A-5C. The client application can exist on the device rendering and/or displaying the client application (e.g., a user device). In some embodiments, the client application includes a script element and/or an inline frame element. The inline frame element can include one or more features as described below. The inline frame element can exist on the device rendering and/or displaying the client application. A host platform server can include one or more features as described above with respect to any of device 200. In some embodiments, the device rendering a webpage is different from the device displaying the webpage (e.g., the displaying device is a thin client).

In some embodiments, client system 602 (or a device associated therewith) issues a GET request to host platform server 604 via an interface (e.g., API) used to communicate with one or more systems of the host platform that supports the ecosystem as described herein. Host platform server 604 can respond to client system 602 with a client secret (e.g., a password, one or more characters, a hash, a token, and/or one or more encrypted values) and an associated expiration for the client secret. For example, this client secret can be used to authenticate a session with the inline frame element that will proxy communication between the client application and the host platform server 604. In some embodiments, an inline frame element (also referred to as an "iframe") is a markup language (e.g., HTML) element that loads another webpage (e.g., HTML page) within a webpage.

In some embodiments, a POST command (which includes a client secret) is issued by a trusted third-party entity via host platform server 604 and received by the client application.

In some embodiments, host platform server 604 passes markup language (e.g., HTML) components, the client secret, and the publishable key to the client application. For example, the markup language components can be HTML components that include references to hosted UI elements (e.g., elements that are not embedded via the host platform's ecosystem) as well as to a script element (e.g., a JavaScript script). In some embodiments, the script element causes the performance of processes established by the developer (e.g., the host platform, a third-party developer) of the user interface element (associated with an extension) and is necessary for rendering the user interface element (associated with an extension). For example, the processes can include processes for loading user interface element(s) (associated with an extension), for setting up a data layer between the user interface element(s) (associated with an extension) and an inline frame element, for creating appropriate permission/security context for the user interface element(s) (associated with an extension), and/or for creating an inline frame element (e.g., an iframe that does not output any user interface to a display, also referred to as an "invisible iframe"). At this point, the client application can be considered a blank page or at least an incomplete page because it does not have information for rendering user interface element(s) (associated with an extension) (e.g., called by a script element). In some embodiments, the client application executes a script element, which creates an inline frame element, and passes the client secret and the publishable key to the inline frame element.

In some embodiments, a script element includes one or more functional layers. As an example, there can be three functional layers that make up what is referred to as a "script element" as described herein. Each of these layers are built together and deployed by the service provider. In some embodiments, webpage script file is a script (e.g., JavaScript) file which is added to the webpage. In some embodiments, the script file executes in the webpage, and loads the extension, handles setting up the data layer (e.g., between the webpage and the inline frame element), and creates appropriate permission and security context for the extension. In some embodiments, this script file also inserts an inline frame element (e.g., an invisible iframe) into the webpage, which points to an html page (e.g., "script_element.html" described below). In some embodiments, this script file contains the platform context data layer, which packages up requests from the extension and sends them to the inline frame element, as well as handling responses and webpage observability. In some embodiments, script element HTML file (e.g., "script_element.html") is an HTML file. In some embodiments, it is served from a server external to the client application (e.g., such as a host platform server 604 or content server 606). In some embodiments, the role of this script element HTML file is to execute script content (e.g., described below) included in the script element HTML file, that makes up the trusted side of the data layer (e.g., between the webpage and the inline frame element). In some embodiments, script content in the script element HTML file is inside of the script element HTML file, script content (e.g., JavaScript) is executed, which handles setting up authentication, providing authentication to requests, and doing all communication through the inline frame element to the third-party platform (e.g., a host platform). In some embodiments, communication with the third-party is performed using an API. In some embodiments, the script element includes an authentication API. For example, this can be a public API method which the client application calls. This API method creates a request to start an embedded session for a given connected account (e.g., of the end user of the client application). The host platform server 604 receives a secret token that it passes off to the script element. In some embodiments, the script element passes this secret to the inline frame element, which calls a private API method to consume that secret, and return an API key (e.g., also referred to as a merchant key or user key) which the inline frame element then uses to authenticate requests made to the host platform server (e.g., 604) and/or content server (e.g., 606).

In some embodiments, the script element of the client application and/or inline frame element form an API proxy. In some embodiments, when an user interface element (associated with an extension) (e.g., a transactions list element) needs to fetch data from a remote resource (e.g., host platform server 604 and/or content server 606), an API client is provided by the script element which transparently proxies the API request through the inline frame element to the script inside of the inline frame element (e.g., script content in the script element HTML file). The script inside of the inline frame element adds the authentication it has set up, and then calls the remote resource's API endpoint, which returns the result back through the inline frame element.

In some embodiments, permissions for accessing and/or modifying data is controlled by one or more of account policy and limitations imposed on or by a host platform. For example, a user account (subaccount) logged in through a web browser that loads the service provider webpage can have a limited set of permissions. This set of permissions can be the intersection of what the client application (e.g., that is using the respective extension) is permitted to do and/or what the host platform server permits the subaccount to do (e.g., using the respective extension). For example, the third-party developer platform can limit permissions for requests received via user interface element(s) (associated with an extension) so that the elements are only subject to a single authentication factor. In some embodiments, there is an upper bound for the number of extension requests from a webpage platform.

In some embodiments, a single authentication factor is required for access by a subaccount. This allows some level of activity by the user via the user interface element (associated with an extension). In some embodiments, a multi-factor authentication is required for access by a subaccount. Once additional required authentication factor is provided, the subaccount user can be granted additional permissions.

In some embodiments, the inline frame element issues a POST request to host platform server 604, the POST request including the client secret and the publishable key. At this stage, the inline frame element is attempting to establish authentication with host platform server 604, such that the inline frame element can act as a trusted proxy between the client application and the host platform server 604 and/or content server 606. In some embodiments, host platform server 604 issues a response that includes an API key (e.g., for signing communication between the inline frame element using the host platform server 604) and an associated expiration for the API key. In some embodiments, the inline frame element is initialized (e.g., and informs one or more components of the client application). At this point, the inline frame element can now request and receive data related to the extension via the host platform server 604.

In some embodiments, the client application issues a request, to the inline frame element, associated with an operation (e.g., requesting instructions, code, a set of data such as business transactions data, and/or performance of an operation by a server) associated an extension (e.g., associated with user interface elements 520, 530, and/or 540). In some embodiments, the inline frame element (acting as a proxy) issues a GET request (including the API key) through the host platform server 604. In some embodiments, the host platform server 604 responds (e.g., with instructions, code, a set of data such as business transactions data, and/or results of an operation performed by a server) to the inline frame element acting as proxy, which is then passed to the client application at step 630. At this point, the client application can be considered loaded because the client application has received the appropriate data for displaying rendered the user interface element (associated with an extension), for example, that presents business transactions data visualized according to an extension of the application.

In some embodiments, a client application and a remote server perform a series of communications for supporting user interaction with the extension. For example, the user can manipulate presented business transaction data by modifying an entry. In some embodiments, the client application issues a request to perform an operation (e.g., refund of a particular transaction) to the inline frame element. For example, the user of the client application displaying user interface 400 right clicks a transaction presented in area 404 and selects an option to "Refund Transaction." In some embodiments, the inline frame element (acting as a proxy) issues a POST request (including the API key) through and/or to the host platform server (e.g., 604). In some embodiments, the host platform server responds with an indication that the operation is permitted and/or has been successfully performed (e.g., refund has been successfully processed) to the inline frame element acting as proxy, which is then passed to the client application. This indication can include data (e.g., instructions) that causes and/or allows the user interface element (associated with an extension)

displayed within the client application to appear updated (e.g., a displayed transaction can be marked with a visible indicator "Refunded").

Figure 7:
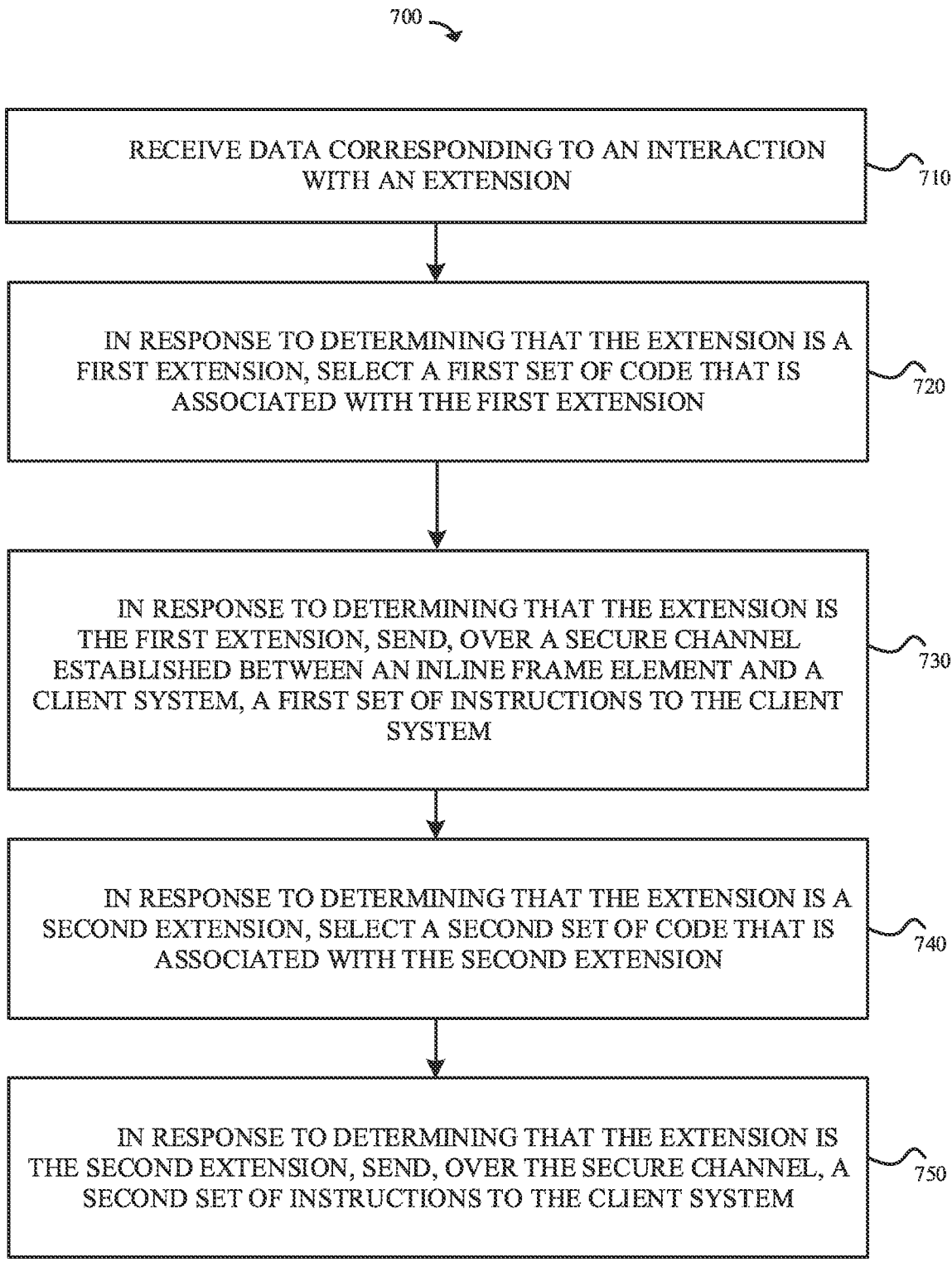
FIG. 7 is a flowchart of a process for deploying an extension in accordance with one or more embodiments described herein.

FIG. 7 is a flow diagram illustrating a method for deploying an application extension in accordance with one or more embodiments described herein. Method 700 can be performed by one or more components of FIGS. 1-6 (e.g., computing device 200, host platform server 604).

At block 710, a computing device (e.g., 200, 604, 606) receives, from a client system (e.g., client system 602), data corresponding to an interaction (e.g., 407, 501) with an extension (e.g., selection and/or activation of the extension; user input associated with the extension) (e.g., App 1 402A in FIG. 4, or App 2 402B in FIG. 5A). For example, host platform server 604 receives an indication that client system 602 detects interaction with the extension at block 614 of FIG. 6.

At block 720, in response to determining that the extension is a first extension (e.g., App 1 402A), the computing device selects a first set of code (e.g., program code) that is associated with the first extension.

At block 730, in response to determining that the extension is the first extension (e.g., App 1 associated with 402A), the computing device sends a first set of instructions (e.g., including updated display data, or other data allowing the client system to perform an operation and/or update the display) to the client system. In some embodiments, the first set of instructions is sent over a secure channel established between an inline frame element and the client system (e.g., authenticated and secured using an API key as described herein). In some embodiments, the first set of instructions is generated based on the data corresponding to the interaction with the extension and the first set of code. For example, the client system causes the client application to update and/or display a UI based on the instructions (e.g., causes the device displaying user interface 400 to display user interface elements in area 404 of FIG. 4 and/or as user interface element 530 in FIG. 5A)).

At block 740, in response to determining that the extension is a second extension (e.g., that is different from the first extension) (e.g., App 2 402B in FIG. 5A), the computing device selects a second set of code that is associated with the second extension, wherein the second set of code is different from the first set of code.

At block 750, in response to determining that the extension is the second extension, the computing device sends a second set of instructions to the client system. In some embodiments, the second set of instructions is sent over the secure channel established between the inline frame element and the client system. In some embodiments, the second set of instructions is generated based on the data corresponding to the interaction with the extension and the second set of code. For example, the client system causes the client application to update and/or display a UI based on the instructions (e.g., causes the device displaying user interface 500 to display user interface elements in area 404 of FIG. 4 and/or as user interface element 540 in either FIG. 5A or 5B).

In some embodiments, sending the first set of instructions causes one or more client systems to display a first user interface element (e.g., 530) (e.g., within area 404). In some embodiments, sending the second set of instructions causes the one or more client systems to display a second user interface element (e.g., 540) (e.g., within area 404) that is different from the first user interface element.

In some embodiments, in response to determining that the extension is the first extension, the first user interface element (e.g., 530) (e.g., within area 404) is caused to be displayed at a position that is relative to the position of the inline frame element (e.g., a headless iframe) in a markup document (e.g., HTML document). In some embodiments, in response to determining that the extension is the second extension, the second user interface element (e.g., 540) is caused to be displayed at the position that is relative to the position of the inline frame element in the markup document. For example, the location within an HTML document of an inline frame element associated with the user interface element can define where in the resulting user interface 500 (e.g., webpage dashboard) the user interface element is displayed.

In some embodiments, the first set of instructions includes markup data (e.g., HTML data) corresponding to the first user interface element, and wherein the second set of instructions includes markup data corresponding to the second user interface element.

In some embodiments, the inline frame element is a headless inline frame (e.g., an invisible iframe).

In some embodiments, further in response to determining that the extension is the first extension (e.g., App 1 402A), authenticating sending instructions via the inline frame element using a resource (e.g., host platform network 110, host platform server 604, content server 606) that is associated with a first entity (e.g., developer of the host platform network 110) corresponding to the first extension. In some embodiments, further in response to determining that the extension is the second extension (e.g., App 2 402B), authenticating sending instructions via the inline frame element using a resource that is associated with a second entity (e.g., a third-party developer different than the developer of a host platform) corresponding to the second extension, wherein the first entity is different from the second entity.

In some embodiments, the first set of code and the second set of code are selected from a content delivery network (e.g., content server 606), and wherein the first set of code and the second set of code are executed remote from the client system (e.g., executed by host platform server 604).

In some embodiments, the computing system receives, from the client system, a request to perform an operation on a set of data using the extension. For example, the operation is a modification to a set of data accessed by the extension. In response to determining that the extension (e.g., the first extension or the second extension) and the client application (e.g., displaying user interface 500) each have permission to perform the operation on the set of data, permitting the operation on the set of data. In some embodiments, a user or user account associated with (e.g., logged into) the client application additionally needs to have permission to perform the operation as well. In response to determining that the extension and the client application do not each have permission to perform the operation on the set of data, forgoing permitting the operation on the set of data. In some embodiments, the first extension has a first set of permissions that permit operation on the set of data, and the second extension has a second set of permissions, different than the first set of permissions, that do not permit operation on the set of data. For example, App 2 does not include permission to access income and expense data for enabling the customer contact functionality; however, App 1 does have access to such data for generating the cash flow YTD visualization.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described to best explain the principles and practical applications of the various embodiments, to thereby enable others skilled in the art to best utilize the various embodiments with various modifications as may be suited to the particular use contemplated.

What is claimed is:

1. A computer system, comprising:
   one or more processors; and
   a memory storing one or more programs configured to be executed by the one or more processors, the one or more programs including instructions to perform:
      receiving, from a client system, data corresponding to a user interaction with an extension; and
      in response to determining that the extension is a first extension:
         selecting a first set of code that is associated with the first extension; and
         sending a first set of instructions to the client system over a secure channel established between an inline frame element and the client system, wherein the first set of instructions is generated based on the data corresponding to the user interaction with the extension and the first set of code; and
      in response to determining that the extension is a second extension that is different from the first extension:
         selecting a second set of code that is associated with the second extension, wherein the second set of code is different from the first set of code; and
         sending a second set of instructions to the client system over the secure channel established between the inline frame element and the client system, wherein the second set of instructions is generated based on the data corresponding to the user interaction with the extension and the second set of code, and wherein the second set of instructions is different from the first set of instructions.

2. The computer system of claim 1, wherein sending the first set of instructions causes one or more client systems to display a first user interface element, and wherein sending the second set of instructions causes the one or more client systems to display a second user interface element that is different from the first user interface element.

3. The computer system of claim 2, wherein the one or more programs further include instructions to perform:
   in response to determining that the extension is the first extension, the first user interface element is caused to be displayed at a position that is relative to a position of the inline frame element in a markup document; and
   in response to determining that the extension is the second extension, the second user interface element is caused to be displayed at the position that is relative to the position of the inline frame element in the markup document.

4. The computer system of claim 2, wherein the first set of instructions includes markup data corresponding to the first user interface element, and wherein the second set of instructions includes markup data corresponding to the second user interface element.

5. The computer system of claim 1, wherein the first set of code and the second set of code are selected from a content delivery network, and wherein the first set of code and the second set of code are executed remotely from the client system.

6. The computer system of claim 1, wherein the one or more programs further include instructions to perform:
   receiving, from the client system, a request to perform an operation on a set of data using the extension;
   in response to determining that the extension and the client system each have permission to perform the operation on the set of data using the extension, permitting the operation on the set of data using the extension; and
   in response to determining that the extension and the client system do not each have permission to perform the operation on the set of data using the extension, forgoing permitting the operation on the set of data using the extension,
      wherein the first extension has a first set of permissions that permit operation on the set of data using the extension, and
      wherein the second extension has a second set of permissions, different from the first set of permissions, that do not permit operation on the set of data using the extension.

7. A non-transitory computer-readable storage medium storing one or more programs configured to be executed by one or more processors of a server, the one or more programs including instructions to perform:
   receiving, from a client system, data corresponding to a user interaction with an extension; and
   in response to determining that the extension is a first extension:
      selecting a first set of code that is associated with the first extension; and
      sending a first set of instructions to the client system over a secure channel established between an inline frame element and the client system, wherein the first set of instructions is generated based on the data corresponding to the user interaction with the extension and the first set of code; and
   in response to determining that the extension is a second extension that is different from the first extension:
      selecting a second set of code that is associated with the second extension, wherein the second set of code is different from the first set of code; and
      sending a second set of instructions to the client system over the secure channel established between the inline frame element and the client system, wherein the second set of instructions is generated based on the data corresponding to the user interaction with the extension and the second set of code, and wherein the second set of instructions is different from the first set of instructions.

8. The non-transitory computer-readable storage medium of claim 7, wherein sending the first set of instructions causes one or more client systems to display a first user interface element, and wherein sending the second set of instructions causes the one or more client systems to display a second user interface element that is different from the first user interface element.

9. The non-transitory computer-readable storage medium of claim 8, wherein the one or more programs further include instructions to perform:

in response to determining that the extension is the first extension, the first user interface element is caused to be displayed at a position that is relative to a position of the inline frame element in a markup document; and in response to determining that the extension is the second extension, the second user interface element is caused to be displayed at the position that is relative to the position of the inline frame element in the markup document.

10. The non-transitory computer-readable storage medium of claim 8, wherein the first set of instructions includes markup data corresponding to the first user interface element, and wherein the second set of instructions includes markup data corresponding to the second user interface element.

11. The non-transitory computer-readable storage medium of claim 7, wherein the first set of code and the second set of code are selected from a content delivery network, and wherein the first set of code and the second set of code are executed remotely from the client system.

12. The non-transitory computer-readable storage medium of claim 7, wherein the one or more programs further include instructions to perform:

receiving, from the client system, a request to perform an operation on a set of data using the extension;

in response to determining that the extension and the client system each have permission to perform the operation on the set of data using the extension, permitting the operation on the set of data using the extension; and in response to determining that the extension and the client system do not each have permission to perform the operation on the set of data using the extension, forgoing permitting the operation on the set of data using the extension, wherein the first extension has a first set of permissions that permit operation on the set of data using the extension, and wherein the second extension has a second set of permissions, different from the first set of permissions, that do not permit operation on the set of data using the extension.

13. A method, comprising:

receiving, from a client system, data corresponding to a user interaction with an extension; and in response to determining that the extension is a first extension:

selecting a first set of code that is associated with the first extension; and sending a first set of instructions to the client system over a secure channel established between an inline frame element and the client system, wherein the first set of instructions is generated based on the data corresponding to the user interaction with the extension and the first set of code; and in response to determining that the extension is a second extension that is different from the first extension:

selecting a second set of code that is associated with the second extension, wherein the second set of code is different from the first set of code; and sending a second set of instructions to the client system over the secure channel established between the inline frame element and the client system, wherein the second set of instructions is generated based on the data corresponding to the user interaction with the extension and the second set of code, and wherein the second set of instructions is different from the first set of instructions.

14. The method of claim 13, wherein sending the first set of instructions causes one or more client systems to display a first user interface element, and wherein sending the second set of instructions causes the one or more client systems to display a second user interface element that is different from the first user interface element.

15. The method of claim 14, wherein:

in response to determining that the extension is the first extension, the first user interface element is caused to be displayed at a position that is relative to a position of the inline frame element in a markup document; and in response to determining that the extension is the second extension, the second user interface element is caused to be displayed at the position that is relative to the position of the inline frame element in the markup document.

16. The method of claim 14, wherein the first set of instructions includes markup data corresponding to the first user interface element, and wherein the second set of instructions includes markup data corresponding to the second user interface element.

17. The method of claim 13, wherein the inline frame element is a headless inline frame.

18. The method of claim 13, wherein:

in response to determining that the extension is the first extension, authenticating sending instructions via the inline frame element using a resource that is associated with a first entity corresponding to the first extension; and in response to determining that the extension is the second extension, authenticating sending instructions via the inline frame element using a resource that is associated with a second entity corresponding to the second extension, wherein the first entity is different from the second entity.

19. The method of claim 13, wherein the first set of code and the second set of code are selected from a content delivery network, and wherein the first set of code and the second set of code are executed remotely from the client system.

20. The method of claim 13, further comprising:

receiving, from the client system, a request to perform an operation on a set of data using the extension;

in response to determining that the extension and the client system each have permission to perform the operation on the set of data using the extension, permitting the operation on the set of data using the extension; and in response to determining that the extension and the client system do not each have permission to perform the operation on the set of data using the extension, forgoing permitting the operation on the set of data using the extension, wherein the first extension has a first set of permissions that permit operation on the set of data using the extension, and wherein the second extension has a second set of permissions, different from the first set of permissions, that do not permit operation on the set of data using the extension.

* * * * *